United States Patent

Fihn

[15] 3,670,643
[45] June 20, 1972

[54] METHOD FOR TREATMENT OF DISCHARGED SOLIDS FROM A LIQUID STREAM

[72] Inventor: Kurt W. Fihn, Hjalteby, Sweden
[73] Assignee: Esso Research and Engineering Company
[22] Filed: Aug. 13, 1969
[21] Appl. No.: 849,754

[52] U.S. Cl............................................100/37, 100/104
[51] Int. Cl.............................................B30b 9/02
[58] Field of Search..........................................100/104, 37

[56] References Cited

UNITED STATES PATENTS 2,971,217   2/1961   Thomas et al........................100/37 X

FOREIGN PATENTS OR APPLICATIONS 714,361   7/1965   Canada..................................100/104

Primary Examiner—William I. Price
Attorney—Chasan and Sinnock and J. E. Luecke

[57] ABSTRACT

Solids, separated out from a liquid in a tank, are compressed in the tank to remove entrained liquid which flows back to the main body of liquid, and the compressed solids removed. The process, preferably, is continuous with solids discharge valve opening on the compression stroke of the compressing device. Preferably a back pressure is provided in the discharge pipe.

2 Claims, 4 Drawing Figures

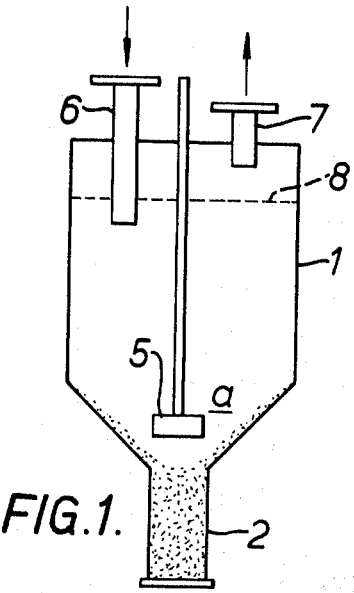
FIG.1.
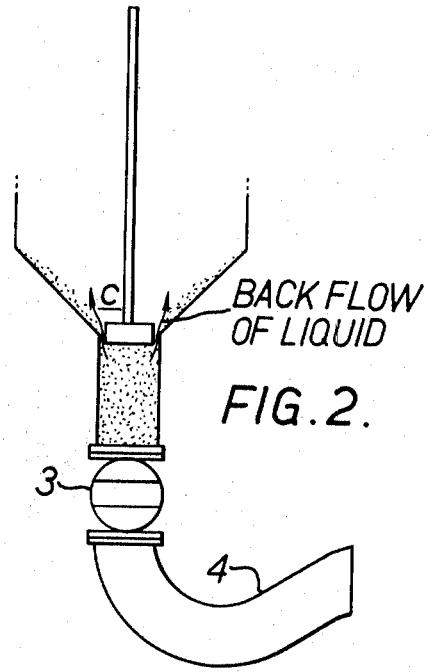
BACK FLOW OF LIQUID
FIG.2.
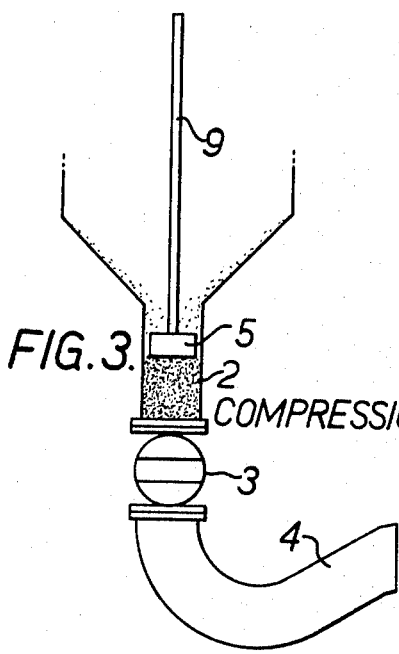
FIG.3. COMPRESSION
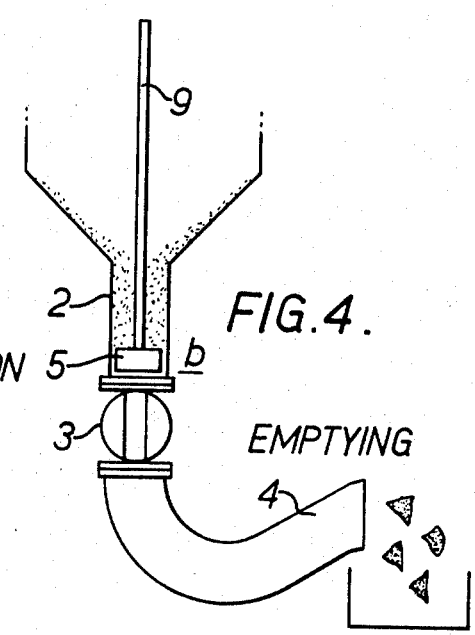
FIG.4. EMPTYING

METHOD FOR TREATMENT OF DISCHARGED SOLIDS FROM A LIQUID STREAM

This invention relates to a method of discharging solids that are separated from a liquid stream by sedimentation or flotation, and to apparatus for carrying out the method of the invention.

In the hitherto known methods for separating solid impurities from a liquid the suspended material has been removed from the system either by continuous or intermittent draining or by taking the separation apparatus out of operation to empty it. In all these cases the separated material will generally contain a substantial amount of liquid.

It is desirable, particularly during continuous operation, to remove the separated material from the liquid stream and to obtain the highest possible concentration of it. This is achieved to a substantial extent by the method of the present invention.

According to the invention solid material separated out from a liquid, in a tank, by sedimentation or flotation, is compressed, whereby entrained liquid is squeezed out and returned to the liquid in the tank, the compressed solid material being discharged from the tank. In a preferred form of the invention the tank is provided with a cylindrical portion, or socket, at the position where the solid material separates out and a plunger moving in or into this position of the tank compresses the separated solid material. The solid material is discharged, intermittently or continuously, suitably through the movement of a valve operating to open on the compression stroke of the compressor, e.g. the plunger, which gives access, when open, to a discharge pipe; preferably the compressed material moves against a back pressure, suitably provided by a core of previously discharged solids material which may be located, e.g. in a U-bend in the discharge pipe appropriately positioned just beyond the valve.

The amount of pressure and compression, that may suitably be used will vary with the type of solid material being removed. Thus, for example where the invention was used for removing coke from a steam cracker primary fractionater bottoms stream, in a hydrocarbon stream cracking process, compression pressures from 20 to 40 Kg/cm², at coke/plunger surface, were used, the pressure being applied for 20 seconds the liquid content of the removed solid material was less than 10 percent. Optimum removal of liquid was obtained when the discharge valve was centered on the cylindrical portion of the tank, in which solid material was compressed.

The invention also relates to an apparatus for carrying out the method of the invention. The apparatus includes a tank through which the liquid is adapted to flow, and solid impurities are separated by sedimentation or flotation: the tank comprises a discharge socket, a plunger lying in its resting position outside one end of the discharge socket, and being movable into the socket, for compressing the material therein and for discharging the material thus compressed, there being a clearance between the plunger and the inner wall of the discharge socket when the plunger is moving inside the socket, the clearance permitting liquid, freed by such compression to flow back to the main body of liquid; a valve is positioned at the other end of the discharge socket and is arranged to alternately cut off the socket from, or connect it to a discharge pipe; the movements of the valve and of the plunger are so coordinated that valve opening can occur only when the plunger is in a compression position in the discharge socket.

When there is a large pressure difference between the tank and the discharge pipe a pressure lock is arranged in the discharge pipe. To achieve a suitable back-pressure the discharge pipe is suitably U-shaped and is kept filled with previously compressed and separated material.

The present invention provides an advantage in that the separated material is obtained in a high concentration, with decreased product loss. This will generally also mean that the subsequent handling will become easier and cleaner. Thus, the often dirty and time-consuming manual work of draining and cleaning, required by some prior apparatuses of filter type, is avoided.

The invention is illustrated by reference to the accompanying drawings showing one embodiment to which, however, the invention is not limited. In the drawings FIG. 1 shows, schematically, a sedimentation tank provided with a plunger, FIG. 2 show, schematically, the lower part of the tank with the discharging device when the plunger has just started moving, and FIG. 3 and FIG. 4 are views similar to that of FIG. 2 but showing the discharging device at the commencement and conclusion of the compression and discharging stages, respectively.

The drawings show a sedimentation apparatus, i.e. one where the solids to be separated are heavier than the liquid.

The apparatus comprises a tank 1 which is conically shaped at its bottom portion. The conical part, at the tank bottom, merges into a discharge socket 2 for the material separated by sedimentation. In the lower end of this discharge socket a valve 3, e.g. a ball valve, is mounted and arranged to alternatively close the discharge socket (as shown in FIG. 3) from and open it (as shown in FIG. 4) to a discharge pipe 4 which is positioned directly adjacent valve 3 and which, in the embodiment as shown, consists of a pipe that is U-shaped in that part next to valve 3. The pipe is kept filled with previously compressed and discharged material so that a back-pressure is established when further solids are discharged.

The tank contains a plunger 5. This plunger may be actuated by an external actuating means so as to move from a position (a) above the discharge socket (FIG. 1) to a position (b) directly above the valve 3 (FIG. 4). The plunger is so shaped that liquid may pass upward as shown at (c) (FIG. 2) during compression of the separated material. In the upper part of the tank there are arranged a liquid inlet 6 and a liquid outlet 7. To separate any such solids that have not settled in the tank from the outflowing liquid, there is a filter 8 through which the out-flowing liquid is passed.

If the solids to be separated are lighter than the liquid the above described apparatus may be used in an inverted form, i.e. the discharge socket is positioned in the upper part of the tank and the separation is carried out by flotation.

I claim:

1. A method of treating solids separated out from a liquid, in a tank, by sedimentation or flotation comprising the steps of: compressing the separated solid material so that liquid entrained with the solid material is squeezed out and returned to the liquid in the tank, selectively opening and closing a discharge outlet in predetermined fashion as a function of the compression step, and establishing a back pressure proximate said discharge outlet by operably connecting a U-shaped pipe with said discharge outlet for containing previously discharged material, whereby the outlet is open during compression so that the compressed solid material is discharged from the tank.

2. The method according to claim 1 wherein said discharge outlet operably is connected for the discharge of compressed solid material during the compression stroke only.

* * * * *